(12) United States Patent
Bernauer et al.

(10) Patent No.: US 12,148,539 B2
(45) Date of Patent: Nov. 19, 2024

(54) METHOD FOR REPLACING NUCLEAR REACTOR CORE

(71) Applicant: Radiant Industries, Incorporated, El Segundo, CA (US)

(72) Inventors: Doug Bernauer, El Segundo, CA (US); Armand Eliassen, El Segundo, CA (US)

(73) Assignee: Radiant Industries, Incorporated, El Segundo, CA (US)

( * ) Notice: Subject to any disclaimer, the term of this patent is extended or adjusted under 35 U.S.C. 154(b) by 472 days.

(21) Appl. No.: 17/398,777

(22) Filed: Aug. 10, 2021

(65) Prior Publication Data

US 2022/0051822 A1 Feb. 17, 2022

Related U.S. Application Data

(60) Provisional application No. 63/066,088, filed on Aug. 14, 2020, provisional application No. 63/064,308, filed on Aug. 11, 2020.

(51) Int. Cl.
*G21C 19/10* (2006.01)
*G21C 19/20* (2006.01)
(Continued)

(52) U.S. Cl.
CPC .............. *G21C 19/10* (2013.01); *G21C 19/20* (2013.01); *G21C 19/205* (2013.01); *G21C 1/12* (2013.01);
(Continued)

(58) Field of Classification Search
CPC ...... G21C 19/10; G21C 19/20; G21C 19/205; G21C 19/19; G21C 19/18; G21C 5/06; Y10S 376/918
(Continued)

(56) References Cited

U.S. PATENT DOCUMENTS 2,873,242 A * 2/1959 Treshow ................ G21C 19/10
376/244
3,149,043 A 9/1964 Lester
(Continued)

FOREIGN PATENT DOCUMENTS

CN 101584007 A 11/2009
JP 6236437 B2 11/2017
(Continued)

OTHER PUBLICATIONS

Beck et al., "High Temperature Gas-Cooled Reactors Lessons Learned Applicable to the Next Generation Nuclear Plant", Apr. 1, 2011, US Department of Energy National Library, pp. 1-78.
(Continued)

*Primary Examiner* — Jack W Keith
*Assistant Examiner* — Daniel Wasil
(74) *Attorney, Agent, or Firm* — KDW Firm PLLC

(57) ABSTRACT

A modular nuclear reactor system includes a lift-out, replaceable nuclear reactor core configured for replacement as a singular unit during a single lift-out event, such as rather than lifting and replacing individual fuel assemblies and/or fuel elements. The system includes a reactor vessel and a power generation system configured to convert thermal energy in a high temperature working fluid received from the reactor vessel into electrical energy. The reactor vessel includes: a vessel inlet and an adjacent vessel outlet arranged near a bottom on the vessel; a vessel receptacle configured to receive a unified core assembly; locating datums in the base of the vessel receptacle and configured to constrain a core assembly in multiple degrees of freedom; and an interstitial zone surrounding the vessel receptacle and housing a set of control or moderating drums.

10 Claims, 7 Drawing Sheets

(51) Int. Cl.
*G21C 1/12* (2006.01)
*G21C 5/06* (2006.01)
*G21C 5/10* (2006.01)
*G21C 19/18* (2006.01)
*G21C 19/19* (2006.01)

(52) U.S. Cl.
CPC .................. *G21C 5/06* (2013.01); *G21C 5/10* (2013.01); *G21C 19/18* (2013.01); *G21C 19/19* (2013.01)

(58) Field of Classification Search
USPC .......................................... 376/264, 269, 918
See application file for complete search history.

(56) References Cited

U.S. PATENT DOCUMENTS

| | | |
|---|---|---|
| 3,164,525 A | 1/1965 | Wetch |
| 3,206,370 A | 9/1965 | Hugh |
| 3,206,373 A | 9/1965 | Gerard |
| 3,728,221 A | 4/1973 | Waldis |
| 4,183,785 A | 1/1980 | Blum |
| 4,689,194 A | 8/1987 | Wachholz |
| 4,701,298 A | 10/1987 | Schoening |
| 4,708,842 A | 11/1987 | Veronesi |
| 5,724,398 A | 3/1998 | Burrow |
| 6,186,568 B1 * | 2/2001 | Sridhar .................. G21C 19/10 294/93 |
| 10,665,357 B2 | 5/2020 | Singh |
| 11,035,292 B2 | 6/2021 | Simpkin |
| 2008/0196411 A1 | 8/2008 | Kudryavtsev |
| 2010/0260309 A1 | 10/2010 | Hyde |
| 2014/0133619 A1 | 5/2014 | Bilovsky |
| 2015/0357056 A1 | 12/2015 | Shayer |
| 2017/0263345 A1 | 9/2017 | Venneri |
| 2018/0144835 A1 * | 5/2018 | Singh ..................... G21C 19/19 |
| 2018/0277260 A1 | 9/2018 | Marcille |
| 2018/0322968 A1 | 11/2018 | Cheatham, III |
| 2020/0373027 A1 | 11/2020 | Gramlich |
| 2021/0304909 A1 | 9/2021 | Gramlich |
| 2021/0375493 A1 | 12/2021 | Wolodzko |

FOREIGN PATENT DOCUMENTS

| | | |
|---|---|---|
| WO | 2021067901 A1 | 4/2021 |
| WO | 2021067902 A1 | 4/2021 |
| WO | 2021067903 A1 | 4/2021 |
| WO | 2021151055 A1 | 7/2021 |

OTHER PUBLICATIONS

International Search Report and Written Opinion: PCT/US21/45401, mailed Jan. 28, 2022, 5 pages.

* cited by examiner

METHOD FOR REPLACING NUCLEAR REACTOR CORE

CROSS-REFERENCE TO RELATED APPLICATIONS

This Application claims the benefit of U.S. Provisional Application No. 63/064,308 filed on 11 Aug. 2020 and entitled "Nuclear Reactor System with Lift-Out Core Assembly," which is incorporated in its entirety by this reference. This Application claims the benefit of U.S. Provisional Application No. 63/066,088 filed on 14 Aug. 2020 and entitled "Graded Pitch Core for Nuclear Reactor," which is incorporated in its entirety by this reference.

TECHNICAL FIELD

This invention relates generally to the field of nuclear power and more specifically to a new and useful nuclear reactor system with lift-out core assembly in the field of nuclear power.

DESCRIPTION OF THE EMBODIMENTS

Figure 1:
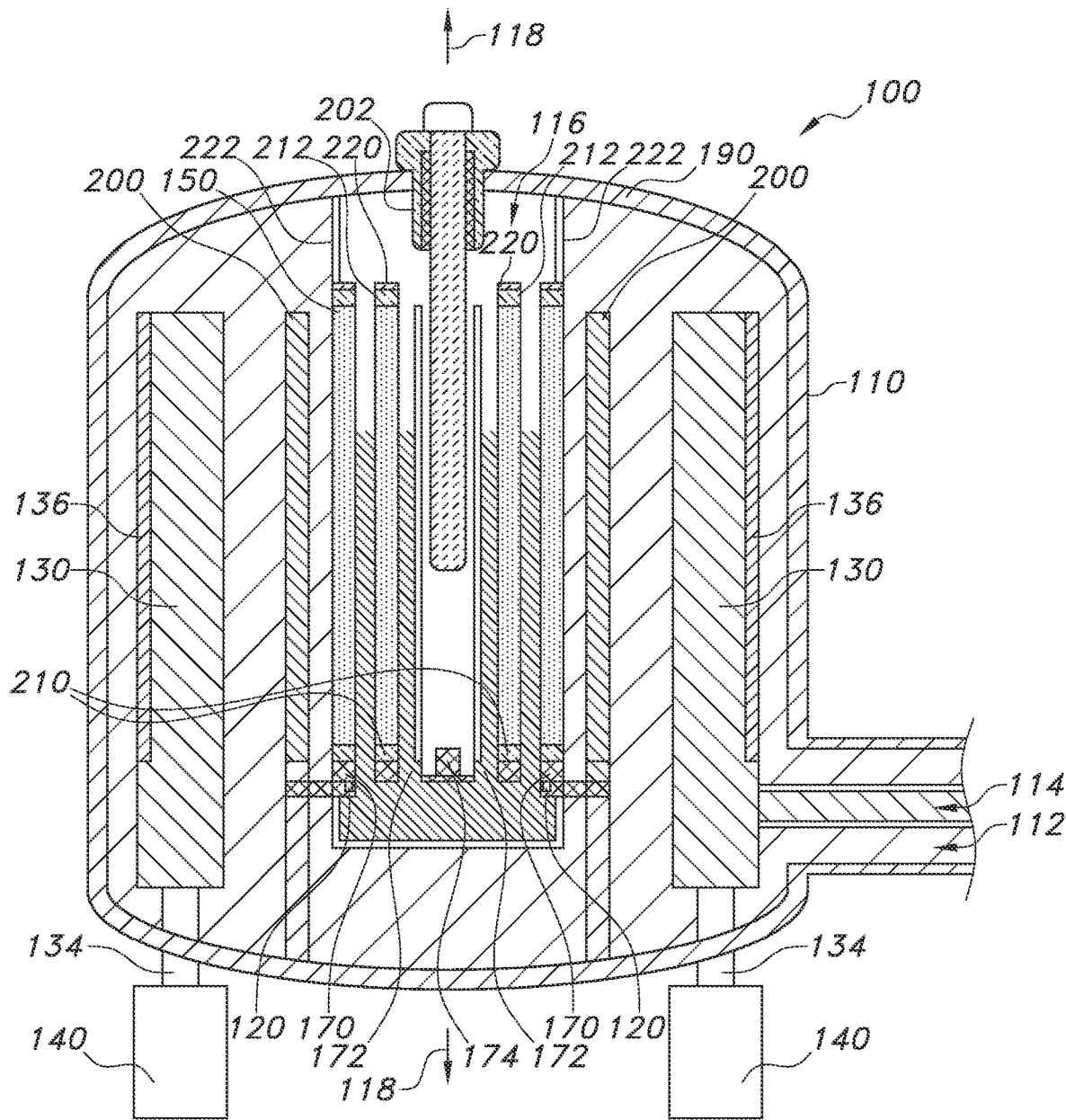
FIG. 1 is a schematic cross-sectional representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-7, a nuclear power reactor system (hereinafter "system") 100 can include a reactor vessel 110 including a core receptacle 116 defining a central axis 118 and including a set of locating datums 120 to receive a nuclear reactor core 150. In the example implementation, the nuclear reactor core 150 can include: a moderating core structure 152 configured to heat a working fluid received through a vessel inlet 112 and transferred through a vessel outlet 114; and a set of locating features 158 configured to mate with the locating datums 120 in the reactor vessel 110 to locate the moderating core structure 152 in the core receptacle 116 and along a flow path between the vessel inlet 112 and the vessel outlet 114. The system 100 can also include a lift-out support plate 170 arranged substantially orthogonal to the central axis 118 and configured to: transiently couple with a lift adapter 176 to lower the nuclear reactor core 150 into the reactor vessel 110 along a direction substantially parallel to the central axis 118; and transiently couple with the lift adapter 176 to raise the nuclear reactor core 150 out of the reactor vessel 110 along the direction substantially parallel to the central axis 118. The system 100 can also include a vessel head 190 configured to transiently install on the reactor vessel 110 over the nuclear reactor core 150 to seal the nuclear reactor core 150 within the reactor vessel 110.

In one variation of the example implementation, the system 100 can include a reactor vessel 110 including: a vessel inlet 112 and a vessel outlet 114 disposed coaxially with the vessel inlet 112; a core receptacle 116 defining a central axis 118 and including a set of locating datums 120 to receive a nuclear reactor core 150; a set of control drums 130 disposed about a periphery of the core receptacle 116; and a set of control drum actuators 140 coupled to the set of control drums 130 and configured to selectively position each of the set of control drums 130. The system 100 can further include a nuclear reactor core 150 including: a moderating core structure 152 including a set of graphite prismatic blocks 154 arranged adjacent a set of vertical flow channels 156 configured to pass a working fluid adjacent the set of graphite prismatic blocks 154 to the vessel outlet 114; a set of locating features 158 configured to mate with the locating datums 120 in the reactor vessel 116 to locate the moderating core structure 152 in the core receptacle 116 and along a flow path between the vessel inlet 112 and the vessel outlet 114; and a lift-out support plate 170 configured to vertically support the moderating core structure 152 during insertion of the moderating core structure 152 into the core receptacle 116 at a first time and during removal and replacement of the moderating core structure 152 from the core receptacle 116 at a second time. The system 100 can also include a vessel head 190 configured to transiently install on the reactor vessel 110 over the nuclear reactor core 150 to seal the nuclear reactor core 150 within the reactor vessel 110.

In one variation of the example implementation, the system 100 can include an annular graphite reflector 200 arranged between the set of control drums 130 and the nuclear reactor core 150. The annular graphite reflector 200 can include a radially variable thickness including, for each of the set of control drums 130, a first thickness along a first radius between the central axis 118 and a control drum axis parallel to the central axis 118; and a second thickness greater than the first thickness along a second radius different than the first radius.

In another variation of the example implementation, the system can include a moderating core structure 152 that includes: a set of graphite prismatic blocks 154 including a set of fuel compacts 160 arranged about the central axis 118. In one alternative implementation of the system 100, the moderator to fuel ratio within a selected volume of material increases as radial distance increases from the central axis 118, which results in even fuel burnup and power generation, decreased thermal gradients across the moderating core structure, and improved economics through the operational life cycle of the moderating core structure.

As described in detail below, the increased moderator to fuel ratio can be achieved by one or more of the following techniques: increasing distance or pitch between a pair of fuel compacts 160 with increasing radial distance from the central axis 118; decreasing coolant channel diameter with increasing radial distance from the central axis 118; and or by discretely or continuously adding strong moderator materials (e.g., ZrH or YH) as radial distance increases from the central axis 118.

As described in more detail below, in one variation of the example implementation, the set of graphite prismatic blocks 154 can be arranged at a minimum radial distance from the central axis 118 such that the moderating core structure 152 defines an annular void along the central axis 118, which is transiently or selectively Tillable with a graphite plug 164 that can be inserted and removed as necessary during refueling operations. Moreover, the geometry of the set of graphite prismatic blocks 154 can be any suitably compact and efficient geometry, including for example blocks defining truncated triangular cross sections or hexagonal cross sections.

2. Method

As shown in FIGS. 7-10, a method for installing a nuclear reactor core can include: locating a shielded core transporter enshrouding a nuclear reactor core to a lowering position over a vessel; aligning a set of locating features arranged on the nuclear reactor core to a set of datum arranged within the vessel adjacent a working fluid plenum; lowering the nuclear reactor core from the shielded core transporter into the vessel such that the set of locating features engage with the set of datum; disengaging a lift adapter from a lift-out support plate arranged with the nuclear reactor core and into the shielded core transporter; removing the shielded core transporter from the lowering position; arranging a vessel head onto the vessel; and sealing the vessel head onto the vessel.

As shown in FIGS. 7-10, a method for removing a spent nuclear reactor core can include: removing a vessel head from a vessel containing a spent nuclear reactor core; locating a shielded core transporter to enshroud the spent nuclear reactor core to a removing position over the vessel; lowering a lift adapter through the shielded core transporter and the spent nuclear reactor core to a lift-out support plate arranged with the spent nuclear reactor core; engaging the lift adapter and the lift-out support plate; lifting the spent nuclear reactor core from the vessel into the shielded core transporter; and translating the spent nuclear reactor core within the shielded core transporter to a second location distal from the vessel.

As shown in FIGS. 7-10, a method for replacing a spent nuclear reactor core with a new nuclear reactor core can include: removing a vessel head from a vessel containing a spent nuclear reactor core; locating a shielded core transporter to enshroud the spent nuclear reactor core to a removing position over the vessel; lowering a lift adapter through the shielded core transporter and the spent nuclear reactor core to a lift-out support plate arranged with the spent nuclear reactor core; engaging the lift adapter and the lift-out support plate; lifting the spent nuclear reactor core from the vessel into the shielded core transporter; and translating the spent nuclear reactor core within the shielded core transporter to a second location distal from the vessel. The method for replacing a spent nuclear reactor core with a new nuclear reactor core can further include: locating a second shielded core transporter enshrouding a new nuclear reactor core to a lowering position over the vessel; aligning a set of locating features arranged on the new nuclear reactor core to a set of datum arranged within the vessel adjacent a working fluid plenum; lowering the new nuclear reactor core from the second shielded core transporter into the vessel such that the set of locating features engage with the set of datum; disengaging the lift adapter from the lift-out support plate arranged with the new nuclear reactor core and into the shielded core transporter; removing the shielded core transporter from the lowering position; arranging the vessel head onto the vessel; and sealing the vessel head onto the vessel.

3. Applications

Generally, the system 100 defines a nuclear reactor (e.g., a high-temperature gas, modular (micro)reactor) including a lift-out, replaceable reactor core assembly configured for replacement as a singular unit during a single lift-out event, such as rather than lifting and replacing individual fuel assemblies. More specifically, the system 100 includes a reactor vessel and a power generation system—such as arranged in a singular module chassis (e.g., a 20-foot-long high-cube shipping container)—configured to convert thermal energy in a high-temperature working fluid (e.g., helium) received from the reactor vessel into electrical energy. The reactor vessel includes: a vessel inlet and an adjacent (e.g., coaxial) vessel outlet arranged near a bottom on the vessel; a vessel receptacle configured to receive a core assembly; locating datums in the base of the vessel receptacle and configured to constrain a core assembly in multiple (e.g., six) degrees of freedom; and an interstitial zone surrounding the vessel receptacle and housing a set of control drums.

Before the system 100 is deployed—such as to a military base, a remote community, or a mineral extraction site—to supply on-demand electrical power (e.g., up to 20 megawatts), a complete core assembly is loaded into the core receptacle, located on the locating datums, and sealed with a vessel head. For example, the core assembly can include nuclear fuel, neutron poison, a cylindrical moderating core structure (e.g., of graphite) housing the nuclear fuel and neutron poison in a set of discrete channels and defining a set of flow channels, and a lift-out support plate that vertically supports the moderating core structure within the vessel receptacle. During a refueling, the vessel head can be removed from the reactor vessel; the core assembly can be removed from the reactor vessel in a single lift event by lifting the lift-out support plate out of the vessel receptacle; a replacement core assembly with new fuel can be lowered into and located within the vessel receptacle; the vessel head can be reinstalled on the reactor vessel; and the system 100 can be redeployed to provide near-continuous power for an additional core life in the same or other application.

Therefore, the system 100 can include a reactor vessel configured to receive replacement core assemblies over time. Thus, components within the system 100 exposed to greatest heat and radiation during operation—such as neutron poison, the moderating core structure, the lift-out plate, neutron reflectors on the top and bottom of the moderating core structure, and a structural casing (or "jacket") around the moderating core structure—are configured for replacement as a singular unit, thereby: reducing the target designed life cycle of these vulnerable elements; lessening mechanical analysis and material performance requirements for these elements; reducing costs of these elements; maintaining better matching of a moderator, neutron poison, and nuclear fuel over the operating lifespan of these elements through the entire operating period of the fuel (e.g., maintaining a consistent active neutron poison to neutron flux ratio for up to a decade of operation of a core assembly); reducing complexity and time allocation for refueling of a nuclear reactor with nuclear fuel; and reducing radiological risk of handing the system 100 and its constituent elements. For example, because the core assembly is configured to lift out of the vessel receptacle in a single lift event in a singular direction, the core assembly can be removed from the vessel receptacle and replaced with a new core assembly automatically (e.g., autonomously) within a sealed hot cell, and the entire core assembly—including moderator and neutron poison—can be loaded into and sealed within a single spent-fuel container for long-term waste containment in which the neutron poison reduces neutron flux within the spent-fuel container.

Generally, the system 100 is described herein as a high-temperature gas, modular, mobile, microreactor configured for temporary deployment before returning to a refueling facility for refueling via replacement of the used core assembly with a new core assembly. However, the system 100 can define a nuclear reactor of any other time, size, or configuration. For example, the system 100 can define a nuclear naval reactor permanently or temporarily installed in a naval vessel and configured for in-field core assembly replacement.

3. Vessel

Figure 5:
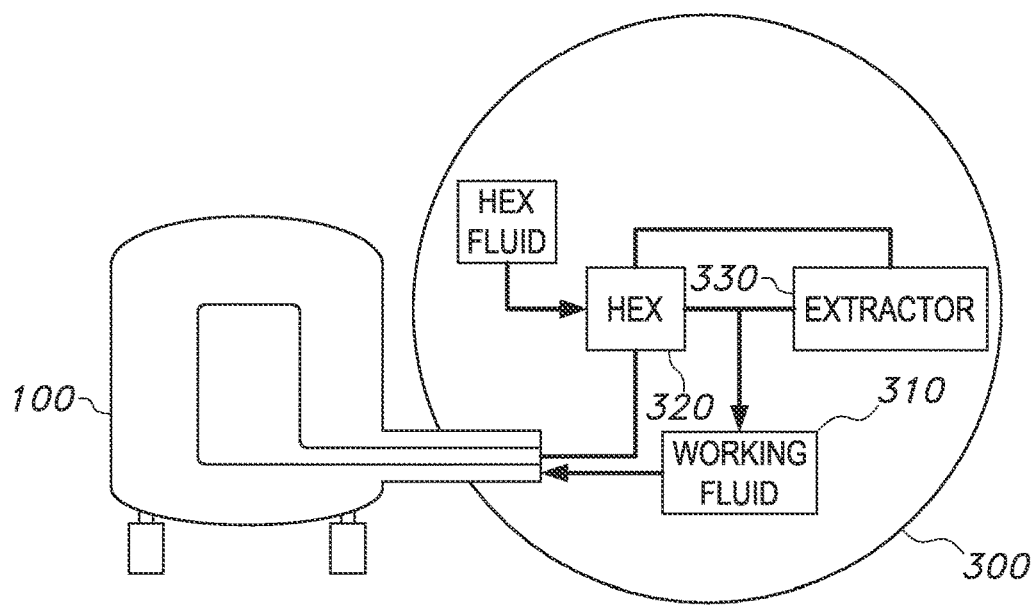
FIG. 5 is a schematic representation of one variation of the system.

As shown in the FIGURES, the vessel 110 is configured to enclose the nuclear reactor core 150, the set of control drums 130, and to contain and circulate a working fluid returning from a power generation system (e.g., a heat exchange system 300), as shown in FIG. 5.

Generally, the vessel 110 can include: a cylindrical, stainless steel or low-alloy steel structure with a domed bottom, a vessel inlet 112, and a coaxial vessel outlet 114 arranged in fluid communication with a core receptacle 116, for example in fluid communication with a plenum configured to remove heated working fluid from the nuclear reactor core 150 to the heat exchange system 300. As described in more detail below, the vessel 110 can also include a set of locating datum 120 arranged and configured to locate the lift out support plate 170 and the nuclear reactor core 150 within the vessel 110. As shown in FIG. 1, the vessel 110 can also include an arrangement of flow dividers and/or manifolds configured to separate flow of working fluid from the nuclear reactor core 150 toward the vessel outlet 114 from flow of working fluid from the vessel inlet 112 up an interstitial zone between walls of the vessel and the nuclear reactor core 150.

As shown in FIG. 1, in one variation of the example implementation, the system 100 includes an emergency neutron poison system 202 that includes a boron carbide elongated member that can be selectively shuttled (e.g., via mechanically threaded actuation) into a central region of the moderating core structure 152 along the central axis 118. As shown in FIG. 1, the emergency neutron poison system 202 is located on the vessel head 190 for lowering into the moderating core structure 152, although the emergency neutron poison system 202 can also be arranged at the bottom of the vessel 110 for raising into the moderating core structure 152.

Additionally or alternatively, the emergency neutron poison system 202 can also include a release sensor and a microcontroller that automatically directs a driver (e.g., shaft seal and external actuator) raises or lowers the boron carbide elongated member into the moderating core structure 152 in response to the detection of emergency conditions necessitating shutdown, e.g., accident, water ingress, transportation, refueling cycle, etcetera. A driver, such as a mechanical or electromechanical screw, can advance and retract the boron carbide elongate member along a set of threads to precisely and incrementally position the boron carbide elongate member within the moderating core structure 152.

In another variation of the example implementation, the boron carbide elongated member can be configured or packaged in a nested or telescoping manner, such that its length extends while being advanced by the driver and its length contracts while being retracted by the driver.

In another variation of the example implementation, the emergency neutron poison system 202 can be irreversible such that once the boron carbide elongate member is positioned into the moderating core structure 152 it cannot be removed through external shock or force, but rather must be removed in accordance with the refueling and nuclear reactor core 150 removal methods described in detail below.

4. Nuclear Reactor Core

Figure 2:
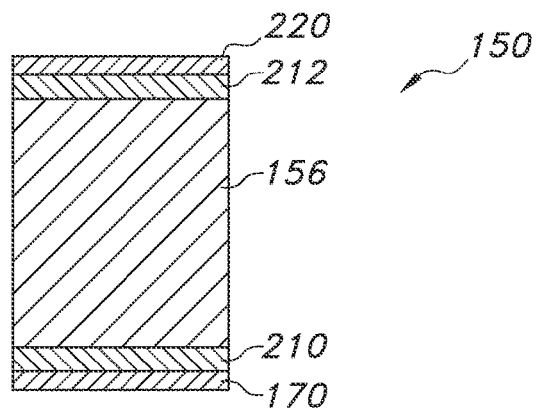
FIG. 2 is a schematic representation of one variation of the system.
Figure 6:
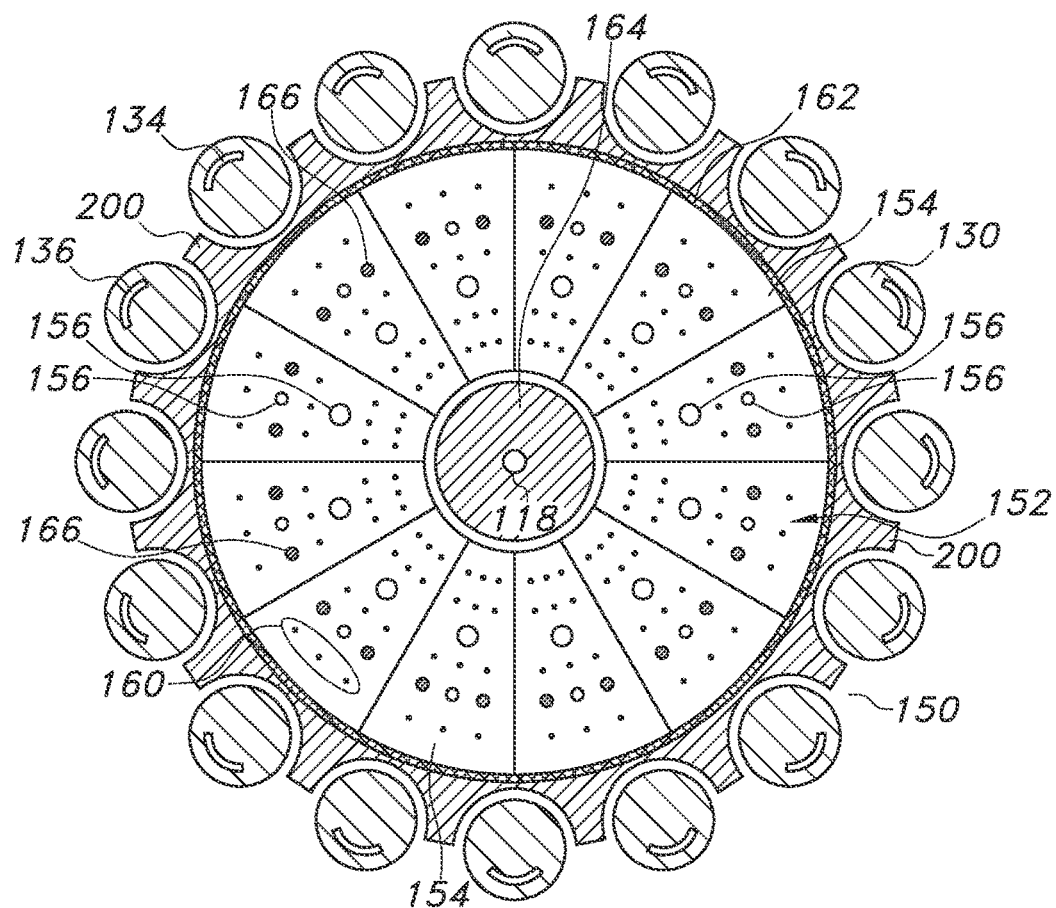
FIG. 6 is a schematic representation of one variation of the system.

Generally, the nuclear reactor core 150 includes: a moderating core structure 152; nuclear fuel in liquid, gas, or solid form; a set or arrangement of neutron poison (in liquid, gas, or solid form); a set of vertical flow channels 156; and a lift-out support plate 170, as shown in FIGS. 1, 2, and 6.

The moderating core structure 152 can include or define a rigid structure that defines sets of channels extending along its height, including: a first set of fuel channels within which nuclear fuel can be disposed, arranged, and/or flow; and a set of vertical flow channels 156 through which an operating fluid (e.g., helium) passes and is heated by the nuclear fuel during operation of the system 100. For example, the set of vertical flow channels 156 can be patterned across the moderating core structure 152 and can extend fully through the moderating core structure 152 parallel to the central axis 118 of the nuclear reactor core 150 such that heated working fluid flows down the vertical flow channels 156 and into the vessel outlet 114.

As shown in FIG. 2, the moderating core structure 156 can be capped by a lower reflector plate 210 and an upper reflector plate 212 in the nuclear reactor core 150, as described below. The lower reflector plate 210 can be arranged between the moderating core structure 156 and the lift out support plate 170. The nuclear reactor core 150 can further include a core restraining plate 220 arranged on top of the upper reflector plate 212 and configured to substantially brace and immobilize the nuclear core reactor 150 upon installation in the vessel 110, as described in more detail below.

In one example implementation shown in FIG. 6, the moderating core structure 152 manufactured in a material—such as graphite—configured to slow incident neutrons and thus increase probability that these neutrons are absorbed by nearby fuel atoms, thereby maintaining criticality of the nuclear fuel and the continuous production of heat through fission reactions. As shown in FIG. 6, the moderating core structure 152 can include a set of graphite prismatic blocks 154 arranged about the central axis 118 such that the set of graphite prismatic blocks 154 is displaced by a minimum radius perpendicular to the central axis 118, thereby defining a central annular void through which the lift adapter 176 can access the lift out support plate 170 during installation and removal of the nuclear reactor core 150, and within which emergency neutron poison can be disposed, as noted above. For example, the annular moderating core structure 152 shown in FIG. 6 can define an inner diameter ranging between ten and twenty centimeters and an outer diameter ranging between twenty and one hundred twenty centimeters, consistent with the size of the vessel 110 and the desired weight, performance, and mobility of the system 100.

In one variation of the example implementation shown in FIG. 6, the nuclear fuel 160 can be disposed or arranged in the graphite prismatic blocks 154 in a series of fuel channels defined within the graphite prismatic blocks 154 and substantially parallel to the central axis 118 and the vertical flow channels 156 through which the working fluid passes. The fuel channels can contain or house nuclear fuel 160 of any type, as well as interspersed or selectively placed neutron poison.

In another variation of the example implementation shown in FIG. 6, the nuclear fuel 160 can include a tristructural-isotropic uranium oxycarbide compact (TRISO) at an initial enrichment range between 15% and 20%, (e.g., approximately 19% initial enrichment). Each nuclear fuel compact 160 can define a structure ranging between one and six centimeters along a long axis and ranging between 0.5 and three centimeters along a short axis. The nuclear fuel compacts 160 can be arranged in the fuel channels in a random lattice within a graphite matrix. Alternatively, the nuclear fuel compacts 160 can be arranged in a graded or structured lattice within a graphite matrix. In another alternative, the matrix in which the nuclear fuel compacts 160 are arranged can include neutron poison materials to moderate the emission and capture of neutrons. In other variations of the example implementation, the nuclear fuel 160 can include (additionally or alternatively): uranium oxide, uranium silicide, uranium carbide, uranium nitride, etcetera.

In another variation of the example implementation shown in FIG. 6, the moderating behavior of the moderating core structure 152 can be varied or tuned to improve power production and economic efficiencies, For example, each of the fuel channels can be arranged within each graphite prismatic block 154 such that the distance (or pitch) between each nuclear fuel compact 160 increases as distance increases from the central axis 118 (as measured along an imaginary line emanating radially perpendicular to the central axis 118 and parallel to the lift out support plate 170). The graded pitch of the nuclear fuel compacts 160 can provide for a very low power peaking factor upon initiation and maintained throughout the life of the nuclear reactor core 150.

In another variation of the example implementation, the moderating core structure 152 can include a set of vertical flow channels 156 of variable diameter such that the diameter of a vertical flow channel within the set of vertical flow channels 156 decreases proportional to an increase in radial distance from the central axis 118. As the vertical flow channels 156 are non-moderating voids in the moderating core structure 152 (fellable with the working fluid as described below), the effect of the variable diameter of the set of vertical flow channels 156 is to vary the moderating effects of the graphite prismatic blocks 156 in relationship to the radial distance from the central axis 118.

In yet another variation of the example implementation, the moderating core structure 152 can include a set of moderating materials 166 disposed in the moderating core structure 152 to increase moderation within the moderating core structure 152 proportional to a radial distance from the central axis 118. Example moderating materials can include Zirconium hydride, Yttrium hydride, Beryllium, or a combination or subcombination thereof.

As shown in FIG. 6, variable moderation across the radii of the moderating core structure 152 can be accomplished with any one or more of the foregoing techniques or methods. In some example implementations, the moderating core structure 152 can further include a a transient graphite plug 164 arranged along the central axis 118 within the moderating core structure 152. The transient graphite plug 164 can be removed and/or inserted (e.g., via robotic or telemanipulation techniques) during refueling operations such that the lift adapter 176 can engage with the lift out plate 170 to remove the entire nuclear reactor core 150 as described in detail below.

As shown in FIG. 6, the geometry of the set of graphite prismatic blocks 164 defines a generally truncated triangular cross section. However, alternative geometries can also be used in combination with the variable moderation techniques described above.

Figure 12:
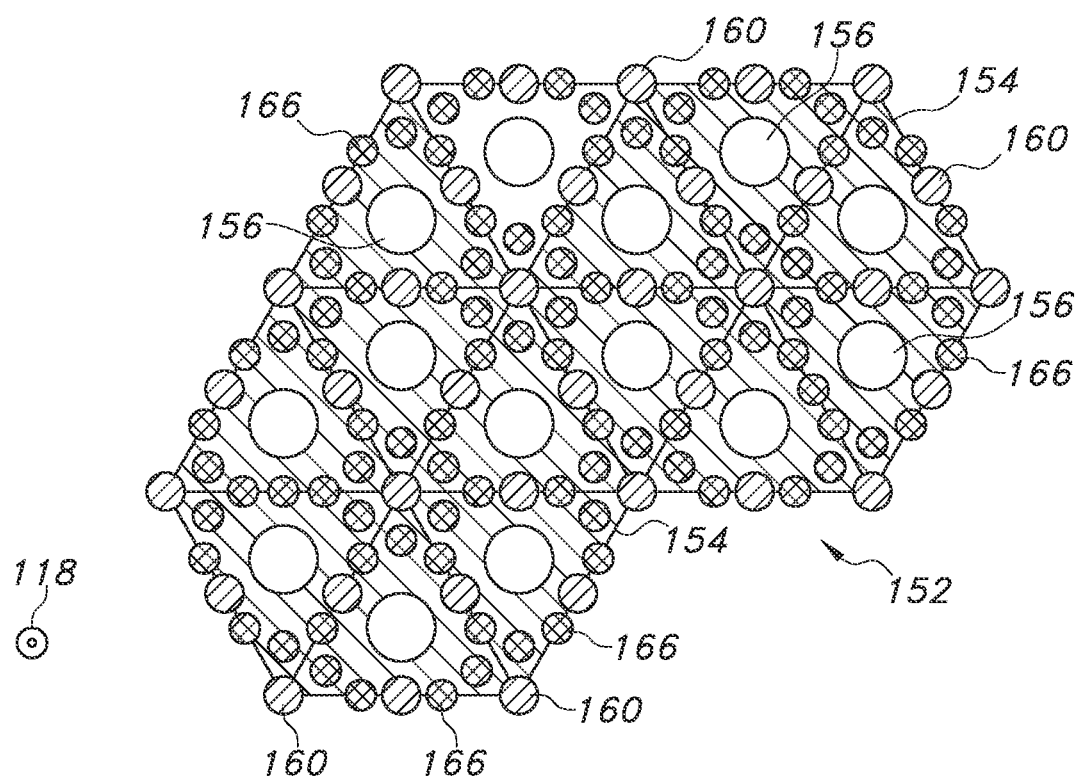
FIG. 12 is a schematic representation of another variation of the system.

For example, as shown in FIG. 12 the graphite prismatic blocks 154 can also be configured with hexagonal cross sections of variable diameter such that the diameter of each respective hexagon increases with increased radial distance from the central axis 118. In this example implementation, each hexagonal graphite prismatic block 154 can include six equilateral triangles, each defining a vertical flow channel 156 along its long axis and parallel to the central axis 118. Moving radially away from the central axis 118, each successive hexagonal graphite prismatic block 154 can include a set of equilateral triangles of larger dimensions, such that each successive hexagonal graphite prismatic block 154 has an increasing ratio of moderating material to fuel. As shown in FIG. 12, the hexagonal graphite blocks 154 can also include fuel compacts 160 and moderating materials 166 arranged about the vertical flow channel 156.

The system 100 can also include a moderating core structure 152 including cylindrical graphite prismatic blocks, rectangular graphite prismatic blocks, pentagonal graphite prismatic blocks, or any combination thereof. As noted above, in any geometrical configuration of the moderating core structure 152, the ratio of moderating structure (e.g., graphite, moderating materials 166) can increase with increasing radial distance from the central axis 118.

As described in detail below, the system 100 permits the unitary installation, removal, and/or replacement of the entire nuclear reactor core 150 including the core structure 156 and the nuclear fuel. Because the moderating core structure 156 is integral with the nuclear reactor core 150, the moderator is replaced with the fuel (and poison) in a single integral nuclear reactor core 150 during a refueling cycle, such as before the moderator reaches turnaround, before the moderator expands and cracks due to extended operation beyond turnaround, or before there is insufficient power generation in the core. As such, because the moderator is replaced with spent fuel (and spent poison) as a complete nuclear reactor core 150, the moderator: can be designed and manufactured for operation over a single core life cycle rather than multiple core life cycles; can avoid turnaround (i.e., transition from contraction to expansion due to elevated temperature and radiation exposure over time) during this single core life cycle; and can therefore maintain greater efficacy at reducing engineering analysis costs over this single core life cycle and reduce risk of failure while the system 100 is in service.

In one variation of the system 100, the nuclear reactor core 150 can include a jacket 162 that defines a substantially cylindrical structure and partially encases the moderating core structure 152 and is configured: to support the exterior of the moderating core structure 152; to protect the exterior of the moderating core structure 154 from damage during transport and installation into the vessel 110; to shield the vessel 110 and control drums 130 during operation by reflecting neutrons traveling outwardly from the nuclear reactor core 150; and to form an inner barrier of the interstitial zone containing the control drums 130 and through which the working fluid flows from the vessel inlet 112 on its way to the top of the vessel 110, as described below.

In one implementation shown in FIG. 6, the jacket 162 includes a continuous annular graphite (or graphitic) structure; and the moderating core structure 152 includes a set of graphite prismatic blocks 154 that nest and are located within the graphite jacket 162 to form an annular moderating core structure 152.

Alternatively, the moderating core structure 152 can define a solid graphite cylinder defining the fuel channels and the set of flow channels 156 extending vertically through the moderating core structure 152. In this alternative moderating core structure 152, the jacket 162 includes a seamless or welded metallic cylinder sized for a maximum interference fit of 0.001" with the moderating core structure 152 at 0° C. in order to minimize compression (e.g., hoop stress) about the moderating core structure 152 during operation. For example, the metallic jacket 162 can exhibit a greater coefficient of thermal expansion than the unitary moderating core structure 152 and can therefore expand to a larger size than the unitary moderating core structure 152 during operation, thereby creating a gap between the inner face of the jacket 162 and the outer face of the moderating core structure 152 and further reducing stress on the moderating core structure 152 during operation.

However, the jacket 162 can include any other material and can define any other geometry or configuration to support, protect, and locate the moderating core structure 152 both during transport outside of the vessel 110 and during operation of the system 100. Alternatively, the system 100 can omit the jacket 162 around the moderating core structure 152.

As shown in FIGS. 1, 2, 7, 8, 9, and 10, the lift-out plate 170 functions to support and immobilize the base of the moderating core structure 152 during transport of the nuclear reactor core 150, during insertion and removal of the nuclear reactor core 150 from the vessel 110, and during operation of the system 100.

In one implementation, the lift out support plate 170 is fabricated in a high temperature alloy and is mechanically fastened to the jacket 162 via a set of posts (e.g., threaded rods) extending through oversized bores extending vertically through the jacket 162. In this implementation, a hook, lifting loop, ferrous element, or other lifting point can be welded or mechanically fastened to each post over the jacket 162. The support plate can alternatively be manufactured in or coated with a neutron-reflective material, such as beryllium oxide, and can therefore function as a lower reflector plate below the core assembly.

Alternatively, the lift out support plate 170 can include an integrated connector 174 configured to engage a lift adapter 176 during insertion and removal of the nuclear reactor core 150 from the vessel 110, as shown in FIGS. 7, 8, 9, and 10. The nuclear reactor core 150 can therefore be lifted vertically and inserted into the vessel 110 without tensioning the nuclear reactor core 150 and with a continuous load path along the central axis 118 and distributed through the lift out support plate 170 and the integrated connector 174.

Figure 7:
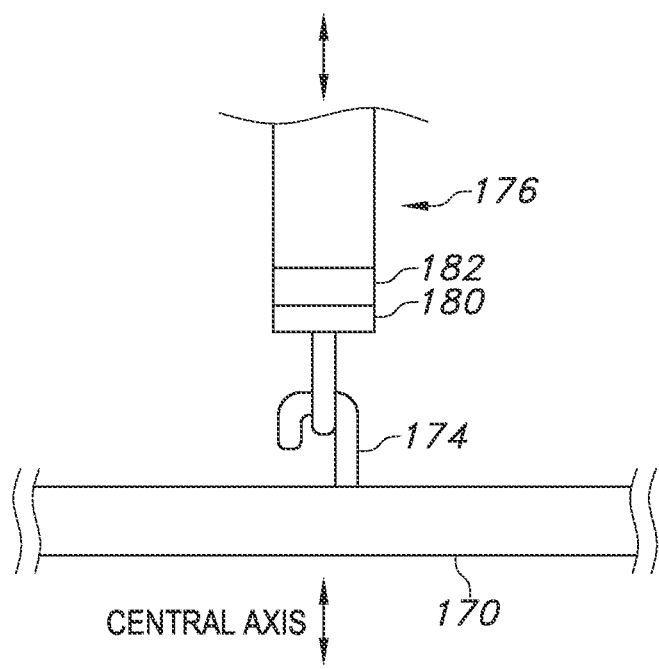
FIG. 7 is a schematic representation of one variation of the system.

The integrated connector 174 can be configured to selectively mate or couple with the lift adapter 176 during insertion and removal of the nuclear reactor core 150 from the vessel 110. In one example implementation, the lift adapter 176 and integrated connector 174 can be configured as a hook and loop assembly as shown in FIG. 7. In another example implementation, the lift adapter 176 and integrated connector 174 can be configured as a magnetic or electromagnetic coupling. In yet another example implementation, the lift adapter 176 can include a male threaded screw or bolt coupled to a controllable drive shaft; and the integrated connector 174 can include a female counterpart to threadedly receive the lift adapter 176 and couple the lift adapter 176 to the integrated connector 174.

In one variation of the example implementations, the lift adapter 176 can be configured to resist rotation or torsional forces along the central axis 118. For example, the lift adapter 176 can include a rigid material that resists torsional forces along its length, such as steel cable, composite cable, graphene-laced cable, or a permutation or set of cables that combine to resist torsional forces. Alternatively, the lift adapter 176 can be connected to a rotatable coupling (not shown) that is configured to apply counter-torsional forces to the lift adapter 176 in response to detecting that the nuclear reactor core 150 is rotating around the central axis 150 during installation or removal. In yet another alternative to the example implementation, the rotatable coupling can apply torsional forces along the lift adapter 176 to steer, rotate, or orient the nuclear reactor core 150 about the central axis 118 during installation.

In another variation of the example implementation, the lift adapter 176 can include a neutron capturing material, such as boron carbide, to shield structural or functional material that bears the load of installing and removing the nuclear reactor core 150 from incident radiation emanating from the nuclear reactor core 150 along the central axis 118, as well as to minimize reactivity levels during transport. For example, the lift adapter 176 can include a boron carbide coating or plating disposed about a central load bearing material, such as steel or composite cabling.

In another variation of the example implementation shown in FIG. 7, the lift out adapter 176 can also include an engagement sensor 180 and a controller 182 connected to or integral with the cable and coupling mechanism. In operation, the engagement sensor 180 can be configured to determine whether the lift adapter 176 is mechanically and/or electromagnetically coupled to the integrated connector 174. The controller 182 can be in communication with the engagement sensor 180 (or integral to the engagement sensor 180) and configured to process an engagement signal from the engagement sensor 180 and relay or transmit the engagement signal 180 to an autonomous or manned operator that controls the vertical and/or radial position of the lift out adapter 176. Therefore, the engagement sensor 180 and controller 182 can cooperate to: ensure that the lift out adapter 176 and integrated connector 174 are in a coupled state prior to moving the nuclear reactor core 150; or in an uncoupled state after placing the nuclear reactor core 150 in the vessel 110 and prior to retracting the lift out adapter 176 from the vessel 110. In another variation of the example implementation, the engagement sensor 180 and/or controller 182 can include a boron carbide plating or coating that shields the engagement sensor 180 and/or controller 182 from incident radiation while installing or removing the nuclear reactor core 150 from the vessel 110.

As shown in FIGS. 1 and 2, the nuclear reactor core 150 can include a separate first lower reflector plate 210: arranged between the moderating core structure 152 and the lift out support plate 172; manufactured in or coated with a neutron-reflective material (e.g., graphite, beryllium or beryllium layered material); and configured to reflect incident neutrons back into the moderating core structure 152.

Similarly, the nuclear reactor core 150 can include a second upper reflector plate 212 arranged across the top of the moderating core structure 152. The second upper reflector plate 212 can also be manufactured in or coated with a neutron-reflective material (e.g., beryllium or beryllium layered material) and configured to reflect incident neutrons back into the moderating core structure 152.

Figure 4:
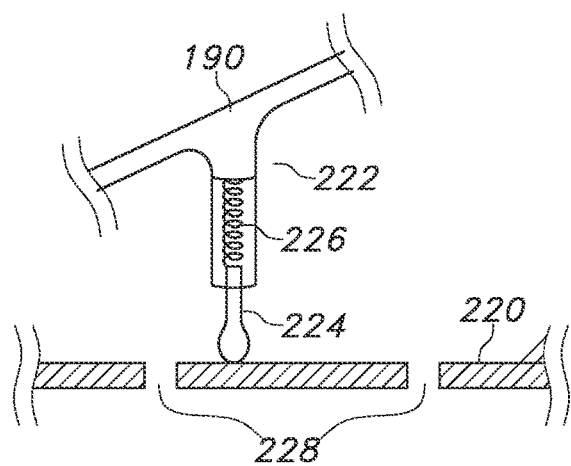
FIG. 4 is a schematic representation of one variation of the system.

Additionally, as shown in FIGS. 1, 2, and 4, the nuclear reactor core 150 can include a core restraining plate 220 arranged on top of the second upper reflector plate 212 and configured to receive a set of upper restraining pins 222 to immobilize and locate the nuclear reactor core 150 within the vessel 110 during operation. As shown in FIG. 4, the set of restraining pins 222 can each include a spring-loaded element 226 (e.g., a coiled spring seated within the pin 222) that, in an extended position applies a spring force against a pin 224. As shown in FIG. 4, the pin 224 can be located against a surface of the core restraining plate 220. The set of restraining pins 222 can be welded, fastened, bolted or otherwise coupled with the vessel head 190 such that when the vessel head 190 is arranged on the vessel 110, the set of restraining pins 222 collectively engage the core restraining plate 220 to apply a compressive force against the second upper reflector plate 212, which in turn is distributed substantially evenly across the graphite prismatic blocks 154 to prevent local stress risers in the graphite and to allow the graphite prismatic blocks 154 to gently expand in a vertical direction against the force of the set of alignment pins 222 while remaining immobilized during transportation and operation.

Figure 11A:
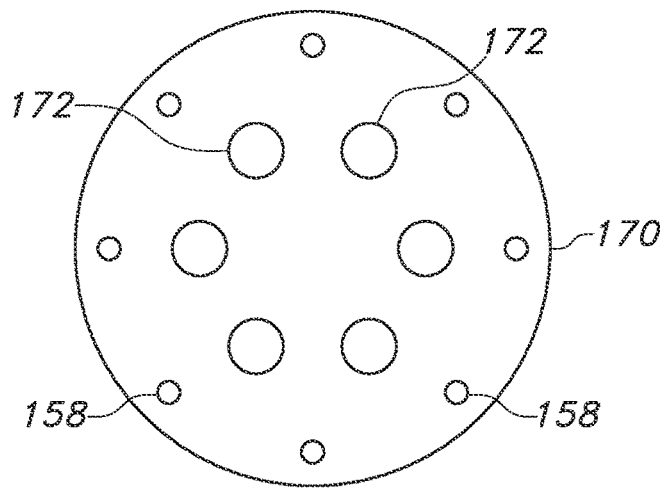
FIG. 11A is a schematic representation of another variation of the system.
Figure 11B:
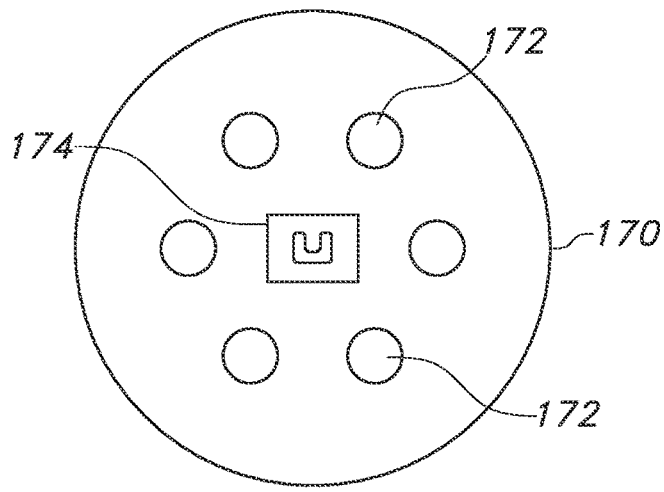
FIG. 11B is a is a schematic representation of another variation of the system.
Figure 11C:
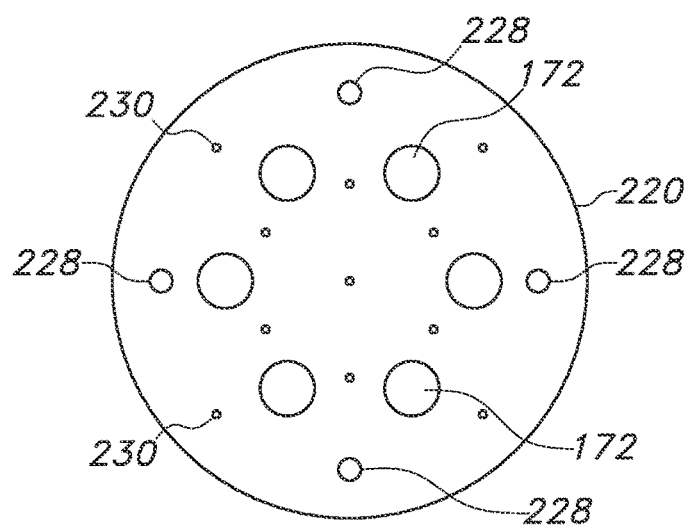
FIG. 11C is a schematic representation of another variation of the system.

In one variation of the example implementation shown in FIG. 11C, the core restraining plate 220 can be composed of a metal alloy (e.g., alloy 800) and include a set of alignment cavities or holes 228 to receive the set of alignment pins 222 and configured to provide an even distribution of the compressive force applied by the set of restraining pins 222. Alternatively, the alignment holes 228 can be shaped in an oval or elliptical cross section to receive the set of alignment pins 222 and to provide for different rates of thermal expansion between the material of the core restraining plate 220 and the set of alignment pins 222. Additionally, the core restraining plate 222 can include a set of bores 230 distributed within the core restraining plate 220 and configured to receive graphite dowels passable through the core restraining plate 222 and into the second upper reflector plate 212.

As shown in FIGS. 1, 11A, 11B, and 11C, the lift out support plate 170, first lower reflector plate 210, upper reflector plate 212, and core restraining plate 220 can each include a set of apertures 172 aligned with flow channels in the moderating core structure 152 such that the working fluid can flow substantially unobstructed through the set of apertures 172 in the core restraining plate 220, the second upper reflector plate 212, the flow channels in the moderating core structure 152, the set of apertures 172 in the first lower reflector plate 210, and then through the set of apertures 172 in the lift out support plate 170 before entering the vessel outlet.

5. Control Drums

Figure 3:
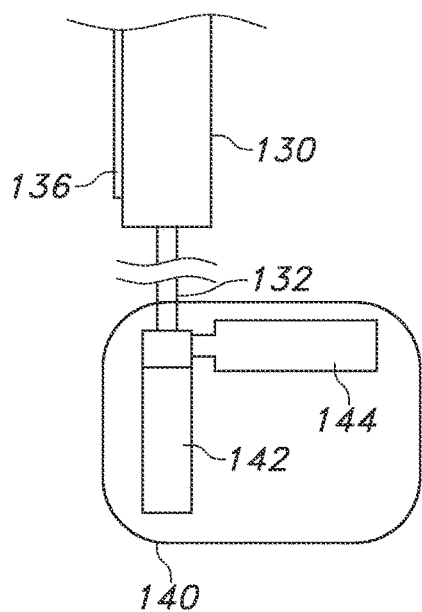
FIG. 3 is a schematic representation of one variation of the system.

As shown in FIGS. 1, 3, and 6, the system 100 also includes a set of control drums 130 arranged in the interstitial zone between the wall of the vessel 110 and the nuclear reactor core 150. Each of the set of control drums 130 can define a generally cylindrical body and be configured to rotate about a long axis substantially parallel to the central axis 118. In one variation of the example implementation, the set of control drum actuators 140 can be coupled to each control drum in the set of control drums 130 through a main shaft 132.

Generally, each control drum in the set of control drums 130 includes: a material exhibiting moderate reflectivity to neutrons, such as carbon or graphite, along a first angle; and a second section including a neutron poison material that absorbs neutrons, such as a boron-based material, along a second angle. Each control drum in the set of control drums 130 is selectively rotatable about its long axis (e.g., a control drum axis), and thus the neutron poison portion of each control drum in the set of control drums 130 can be independently and variably positioned relative to the central axis 118 to control, moderate, and/or reduce reactivity in the nuclear reactor core 150 during operation of the system 100.

As shown in FIG. 6, in one variation of the example implementation, each control drum in the set of control drums 130 includes a solid or monolithic carbon or graphite cylinder with an arcuate channel 134 defined within a angle portion of the curved surface of the cylinder. The arcuate channel 134 can be filled with a neutron poison material, such as a boron carbide plate 136, or any other neutron poison pellets, plates, pastes, or composites. In this variation of the example implementation, the arcuate channel 134 can define an internal volume that is greater than the volume of the boron carbide plate 136 to accommodate a variation or difference in respective rates of thermal expansion. The set of control drums 130 can further include a set of end caps (not shown) disposable about the arcuate channel 134 and configured to contain and/or retain the boron carbide plate 136 within the arcuate channel 134. During operation, if a boron carbide plate 136 is cracked or damaged, the end cap can function to contain any boron carbide fragments or particles and prevent any adverse reaction with the nuclear reactor core 150 from uncontrolled neutron poison material.

In another variation of the example implementation shown in FIG. 6, a neutron poison (e.g., boron carbide) can be fastened, clad, affixed, and/or bonded to a portion of the exterior surface of control drum 130, allowing for increased reactivity swing due to the: closer positioning of the neutron poison material relative to the central axis 118; and the larger surface area of neutron poison material relative to the total surface area of the control drum 130.

In another variation of the example implementation shown in FIG. 1, each control drum actuator within the set of control drum actuators 140 is arranged beneath each control drum 130 in the set of control drums 130. Each control drum actuator 140 can be arranged outside of the vessel 110 and connectable to each control drum 130 via a main shaft 132 that penetrates the hermetically sealed vessel 110 through a sealed bearing or other sealed opening. In operation, each control drum actuator 140 can independently and variably rotate the corresponding control drum 130 about the control drum axis along the main shaft 132 such that the neutron poison material (e.g., the boron carbide plate 136) is arranged at a variable radial distance from the central axis 118. For example, in a configuration in which all the respective boron carbide plates 136 are at a maximal radial distance from the central axis 118, the set of control drums 130 are providing a minimal amount of neutron absorption. Conversely, in a configuration in which all of the control drums 130 are rotated such that the respective boron carbide plates 136 are at a minimal radial distance from the central axis 118, the set of control drums 130 are providing a maximum amount of neutron absorption. When the boron carbide plates 136 are arranged at other angular positions between the maximum and minimum radial distances, the control drums 130 are providing moderate, variable, or tunable neutron moderation.

In one alternative implementation shown in FIG. 3, each control drum actuator 140 can include a stepper motor 142 coupled to the main shaft 132 by an air clutch 144. The air clutch 144 can be selectively engaged and automatically disengaged such that, in normal operating conditions, each control drum actuator 140 can independently and variably control the angular position of the boron carbide plate 136, and therefore independently and variably control the radial distance between the boron carbide plate 136 and the central axis 118 to moderate nuclear reactor core 150 output as described above. The air clutch 144 can also be configured to operate in an emergency or shutdown mode in which the air clutch 144 is disengaged from the stepper motor 142 and the control drum 130 automatically rotates to a position in which the boron carbide plate 136 is arranged facing the central axis 118, (e.g., such that the radial distance between the boron carbide plate 136 and the central axis 118 is minimized to cool the nuclear reactor core 150.

In another alternative implementation, each control drum actuator 140 can include: a position sensor or set of position sensors (e.g., an encoder) connected to the stepper motor 142 and a power and/or data connector coupled to digital and/or analog control circuits within the system 100. Accordingly, the position sensor, power/data connector, and control circuits can cooperate to autonomously or substantially autonomously control rotational position of each of the set of control drums 130 such that: the axis of each control drum 130 can be aligned with the rotational axis of its corresponding main shaft 132 and control drum actuator 140 and can be rotationally oriented to control, dissipate, and/or moderate the reactivity of the nuclear reactor core 150 in response to operator input, detected temperature changes, detected radiation changes, and/or a selected mode of operation (e.g., transportation, installation, initialization, normal operation, shut down, removal).

As shown in FIGS. 1 and 6, the system 100 can also include an annular graphite reflector 200 arranged or interposed between the set of control drums 130 and the nuclear reactor core 150. The annular graphite reflector 200 can be arranged adjacent to or substantially adjacent to the jacket 162 (in implementations in which the nuclear reactor core 150 includes a jacket 162) or the moderating core structure 152. As shown in FIG. 6, the annular graphite reflector 200 can define a fixed inner diameter (e.g., proximate to and greater than the outer diameter of the nuclear reactor core 150 and a variable outer diameter that includes a series of scalloped or curved channels into which each of the set of control drums 130 can be rotatably oriented. For example, the outer diameter can include a set of relatively high radii positioned between each of the set of control drums 130 as measured from the central axis 118 alternating with a set of relatively low radii positioned along an imaginary line extending from the central axis 118 to the control drum axis for each of the set of control drums 130. In this example implementation, the variable radius configuration of the annular graphite reflector 200 functions to: position a relatively large amount of graphite or graphitic material along radii that are not aligned with a control drum axis; position a relatively smaller amount of graphite or graphitic material along radii that are aligned with a control drum axis; permit free and variable rotation of the set of control drums 130; and prevent or substantially prevent emitted radiation from reaching an interior surface of the vessel 110 through interstitial space between the control drums 130.

In other example implementations, the set of control drums 130 can be constructed of multiple materials having distinct neutron capture or reflectivity characteristics. For example, each control drum 130 can include a set of material sectors each exhibiting differing neutron moderation profiles: a first sector including a material having high neutron reflectivity (e.g., beryllium), a second section including a material having high neutron absorption (e.g., boron), and a third section including a transition material exhibiting moderate reflectivity to neutrons, thereby smoothing transition from high neutron reflectivity of the first section to high neutron absorption of the second section. In another example implementation, each control drum 130 can define a triangular cross-section with the first, second, and third sections and corresponding materials arranged on the first, second, and third faces of the control drum. However, each control drum can define any other geometry.

In another example implementation, the system 100 can include a singular circular pattern of control drums 130 arranged at equal radial and angular distances about the central axis 118. For example, the angular distance between two adjacent control drums 130 can be slightly greater (e.g., 0.100" greater) than the maximum width of these control drums 130 such that these control drums 130 pack closely in order to limit incidence of neutrons—emitted by the fuel during operation—on the interior of the vessel 110. Alternatively, the system 100 can include: a first circular pattern of control drums 130 adjacent the wall of the vessel; and a second circular pattern of control drums 130 radially inset from the first circular pattern such that each control drum 130 in the second circular pattern nests between an adjacent pair of control drums 130 in the first circular pattern. Therefore, the first and second circular patterns of control drums 130 can limit or eliminate a clear path from any point on the moderating core structure 152 to the interior of the vessel 110, thereby further reducing incidence of neutrons on the interior of the vessel 110.

6. Vessel Head

As shown in FIGS. 1 and 4, the vessel head 190 is configured to: seal against the top of the vessel 110, thereby enclosing (or "entombing") the nuclear reactor core 150 while the system 100 is in operation; and separate from the vessel 110 when the nuclear reactor core 150 is installed, removed, and replaced.

For example, and as shown in FIG. 1, the vessel head 190 can include: a domed steel structure that is formed, fabricated, or cast, etc.; and a head flange extending outwardly from its perimeter and ground to a nominal flatness. The vessel 110 can be similarly formed, fabricated, or cast, etc. in steel with a vessel flange extending outwardly from its perimeter and ground to the nominal flatness. Once the nuclear reactor core 150 is loaded into the core receptacle 116, the vessel flange and head flange can be welded together to assemble and seal the nuclear reactor core 150 inside the vessel 110 and vessel head 190. Additionally, the vessel head 190 can be connected to the vessel 110 by a set of closure head bolts that can be removed, unthreaded, or cut when removing the vessel head 190 from the vessel 110 during a refueling cycle.

7. Locating Features and Datums

The system 100 also includes a set of locating features 158 affixed to or integrated into the lift out support plate 170 of the nuclear reactor core 150 and configured to transiently mate with locating datums 120 in the base of the vessel 110 in order to repeatably locate and constrain the nuclear reactor core 150 in six degrees of freedom within the vessel 110.

In one example shown in FIG. 11A, the set of locating features 158 includes eight pins extending below the lift out support plate 170 at a particular radial distance and angular positions about the central axis 118. In this example, the set of locating datums 120 includes eight slots arranged in a horizontal plane in the base of the vessel 110, centered at the radial distance from the central axis 118, and extending radially at each angular position. In this example, the pins can be aligned with their corresponding slots when the nuclear reactor core 150 is installed in the vessel 110. During operation, the lift out support plate 170 can thermally expand by a magnitude different from the vessel 110; accordingly, the pins can ride in their corresponding slots, thereby limiting mechanical stress between the vessel 110 and the nuclear reactor core 150 and/or displacement of the nuclear reactor core 150 within the vessel 110 from thermal expansion of the lift out support plate 170.

In the foregoing example, the pins and slots can also be tapered, such as by 16° (i.e., a "self-releasing" tapers) to ease insertion of each pin into its corresponding slot. In a similar example, the set of locating features 158 includes six pins extending below the lift out support plate 170 at a particular radial distance and located at 0°, 60°, 120°, 180°, 240°, and 300° angular positions about the central axis 150, although any number of locating features 158 and corresponding datum 120 can be implemented in the system 100.

In another example implementation, the set of locating features 158 includes a set of ball ends or hemispherical ends extending below the lift out support plate 170 at a particular radial distance and angular positions about the central axis 118. In this example, the set of locating datums 120 includes a set of V-channel blocks arranged in a horizontal plane in the base of the vessel 110, centered at the radial distance from the center of the vessel receptacle, and extending parallel to the angular directions. In this example implementation, when the nuclear reactor core 150 is installed in the vessel 110, each ball end centers within its corresponding V-channel, thereby constraining (and not over-constraining) the nuclear reactor core 150 to the vessel 110 in six degrees of freedom. During operation, as the nuclear reactor core 150 thermally expands at a rate and/or to a magnitude different from the vessel 110, the balls ends can slide along their corresponding V-channels while continuing to constrain the nuclear reactor core 150 in the vessel 110 in six degrees of freedom, thereby limiting mechanical stress, structural fatigue, and/or incidental displacement between the nuclear reactor core 150 and the vessel 110 due to non-uniform heating and differing coefficients of thermal expansion in these elements of the system 100.

Alternatively, in any of the foregoing implementations, the locating datums 120 and locating features 158 can be inverted (e.g., by exchanging male and female mating features) in the lift out support plate 170 and on the vessel 110.

8. Power Generator and Working Fluid

As shown in FIG. 5, the system 100 can further include a heat transfer system 300 including: a helium pump 310, connected to the vessel inlet 112 by an input conduit and the vessel outlet 114 by an output conduit, and configured to pump cooled helium into the vessel inlet 112 through the input conduit and pump heated helium from the vessel outlet 114 through the output conduit. The heat transfer system 300 can also include a heat exchanger 320 where the helium exchanges thermal energy with a secondary fluid loop of supercritical $CO_2$ (alternatively this secondary loop could include air, helium, or water) to exchange thermal energy with the heated helium to cool the heated helium to cooled helium; and an extractor 330 coupled to the supercritical carbon dioxide exchanger 320 and configured to extract thermal energy from the supercritical carbon dioxide 320 and convert the thermal energy into one of heat or electricity.

A flow path, as described below, transfers high-temperature working fluid (e.g., gaseous helium) from the vessel 110 to the heat exchange system 300, which extracts heat from this high-temperature working fluid and converts this heat into electricity and/or usable waste heat. The flow path then returns low(er)-temperature working fluid from the heat exchange system 300 back to the vessel 110, where nuclear fuel in the nuclear reactor core 150 reheats the working fluid before the working fluid returns again to the heat exchange system 300.

In one implementation shown in FIG. 1, the vessel 110 defines a supply manifold below the nuclear reactor core 150 and extending from the lift out support plate 170 to a vessel outlet 114. The vessel outlet 114 is arranged in the base of the vessel 110 and forms a penetration through the vessel 110. Thus, working fluid flowing through the vertical flow channels 156 in the nuclear reactor core 150 rejoins in the outlet manifold and then flows to the vessel outlet 114.

A supply conduit (e.g., a high-temperature, high-pressure seamless pipe) extends from the vessel outlet 114 to the heat exchange system 300. A return conduit includes: a first section coupled to the heat exchange system 300 and physically separated from the supply conduit; and a second section that merges with and encases the supply conduit such that the second section of the return pipe surrounds and is coaxial with the supply conduit as shown in FIG. 1. Therefore, cooler working fluid returning from the heat exchange system 300 to the vessel 110 cools the wall of the inner and outer supply conduits and the pressure vessel, thereby reducing the temperature of these features during operation and extending their operating lifespans.

The vessel 110 also includes: a vessel inlet 112 arranged in the base of the vessel 110 and encompassing (e.g., coaxial with and outwardly offset from) the vessel outlet 112; and a return manifold that extends from the vessel inlet 112 to the interstitial zone between the nuclear reactor core and the wall of the vessel 110.

Therefore, because the vessel inlet 112 and vessel outlet 114 are arranged below the nuclear reactor core 150 in the base or bottom of the vessel 110, the vessel head 190 can be removed from the vessel 110 by removing any bolts and severing a single weld. Conversely, the vessel head 190 can be reinstalled on the vessel 110 by re-welding a single joint between the vessel 110 and the vessel head 190 and affixing any restraining bolts thereto.

The control drums 130 can be arranged in the interstitial zone between the nuclear reactor core 150 and the wall of the vessel 110 such that cooler working fluid moving through the return manifold and into the interstitial zone cools the control drums 130 and the wall of the vessel 110, thereby reducing temperatures of the control drums 130 and the wall of the vessel 110 and extending the operating life of these elements of the system 100. Therefore, the inner supply conduit, the control drums 130, and the wall of the vessel 110 can preheat the working fluid—and are therefore cooled by the working fluid—before the working fluid enters the nuclear reactor core 150.

The system 100 further includes an intermediate manifold that extends from the interstitial zone to the top of the nuclear reactor core 150. More specifically, the intermediate manifold is defined between the vessel head 190 and the top of the nuclear reactor core 150. Therefore, the preheated working fluid passes from the interstitial zone into the intermediate manifold and then into the vertical flow channels 156 in the nuclear reactor core 150. As the working fluid flows down the vertical flow channels 156 toward the supply manifold, energy released by nuclear fuel heats the moderating core structure 152, which heats the working fluid, which in turn enters the supply manifold to complete the flow path.

9. Alternative Geometry: Center Cooling

In one alternative geometry, when assembled, the vessel receptacle 116, nuclear reactor core 150, and vessel head 190 each form a toroidal geometry with a center duct (e.g., a round bore or channel) extending along and about the central axis 118. In this alternative geometry: the vessel 110 can include an inner wall outwardly offset from its axial center; the nuclear reactor core 150 can define an annular geometry with a large bore extending vertically through its axial center; and the vessel head 190 can similarly define an annular geometry.

In a passive cooling configuration, warm air below the system 100 flows upwardly through the center duct via natural convection, thereby passively cooling the surface of the vessel 110 and vessel head 190. In this alternative configuration, the system 100 can also include: a vent (e.g., a louvered vent) arranged across the center duct; and a vent actuator coupled to vent and configured to selectively open and close the vent. For example, a digital controller can: monitor the temperature of the core assembly and/or the surface temperature of the vessel 110; trigger the vent actuator to open the vent to enable greater air flow and greater convective cooling through the center duct when this temperature exceeds a threshold; trigger the vent actuator to close the vent to reduce air flow and reduce convective cooling through the center duct when this temperature is less than the threshold; and implement closed-loop controls to modulate the position of the vent based on the temperature of the nuclear reactor core 150 and/or the surface temperature of the vessel. Additionally or alternatively, the system 100 can include a neutron flux sensor, and an analog circuit can trigger the vent actuator to open the vent when neutron flux detected by the neutron flux sensor exceeds a threshold flux and to close the vent when this neutron flux drops below the threshold flux.

Additionally or alternatively, the system 100 can include a fan (e.g., an electric blower) located in the center duct to form a ducted fan. When active, the fan can draw air upwardly through the center duct to increase cooling of the surface of the vessel; no and vice versa.

Therefore, in this variation, the vent actuator and/or the fan can be activated by the digital controller and/or by the analog circuit described above based on core temperature, surface temperature of the vessel 110, and/or neutron flux within the nuclear reactor core 150.

10. Method of Deployment and Operation

An example method for installing, removing, and replacing a nuclear reactor core 150 within the system 100 is schematically shown in FIGS. 7, 8, 9, and 10. Generally, the vessel 110, heat exchange system 300, flow path, and controls can be installed on a chassis and cladded with shielding. For example, the entire system 100 can be installed in one or two 20-foot-long high-cube shipping containers with shielding, thereby enabling the system 100 to be transported on a flatbed, a trailer, a ship, and/or an aircraft. Due to its mobility, the system 100 can be: deployed to a temporary military installation; deployed to a remote village; used at a remote mineral extraction site; or deployed during disaster relief to supply power in locations with damaged infrastructure.

The system 100 can therefore be deployed and operated (at variable power outputs based on control drum positions over time) over an extended duration of time, such as eight years. Once the power output of the system 100 drops below a threshold, the system 100 can be shipped to a processing facility for replacement of the spent nuclear reactor core 150 with a new or refurbished nuclear reactor core.

The techniques and methods described herein can be performed in an autonomous or semi-autonomous manner by specialized robotic systems, human-directed robotic telemanipulation, or any combination thereof. As shown in FIGS. 7, 8, 9, and 10, the installation and removal of the nuclear reactor core 150 in and from the vessel 110 can include coupling the lift adapter 176 to the lift out support plate 170 and moving the nuclear reactor core 150 in or out of the vessel 110 along the central axis 118.

Figure 8:
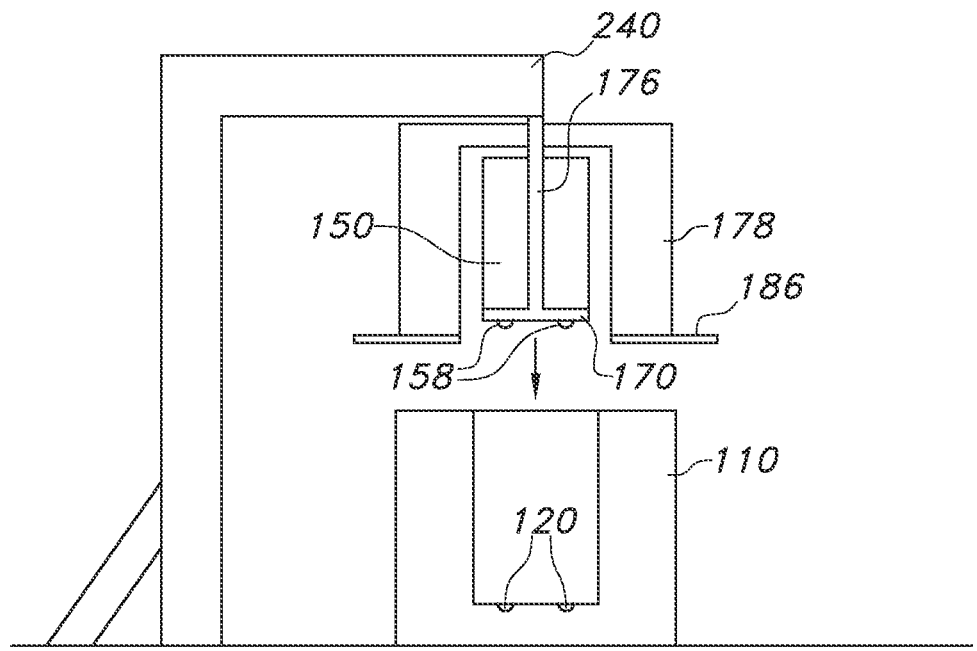
FIG. 8 is a schematic representation of a method for handling a nuclear reactor core.

As shown in FIG. 8, an automated method for installing a nuclear reactor core 150 can include: locating a shielded core transporter 178 enshrouding a nuclear reactor core 150 to a lowering position over a vessel 110; aligning a set of locating features 158 arranged on the nuclear reactor core 150 to a set of datum 120 arranged within the vessel 110 adjacent a working fluid plenum; and lowering the nuclear reactor core 150 from the shielded core transporter 178 into the vessel 110 such that the set of locating features 158 engage with the set of datum 120. Once the nuclear reactor 150 core is aligned and mated within the vessel 110, the method can include disengaging a lift adapter 176 from a lift-out support plate 170 arranged with the nuclear reactor core 150, and into the shielded core transporter 178; removing the shielded core transporter 178 from the lowering position; arranging a vessel head 190 onto the vessel 110; and sealing the vessel head 190 onto the vessel 110.

As shown in FIG. 7, the nuclear reactor core 150 can be located substantially within the shielded core transporter 178 to minimize any radiation leak into the environment. A remotely controlled, autonomous, or semi-autonomous gantry system (hereinafter, automated core replacement system 240) can lift and steer the shielded core transporter 178 to a location just above (i.e., partially resting on) the vessel 110 during the installation process. Furthermore, the method can also include affixing and/or immobilizing the core restraining plate 220 to the top of the second reflector plate 212 by compressing the set of upper restraining pins 222 against the core restraining plate 220 during placement and sealing of the vessel head 190.

Figure 9:
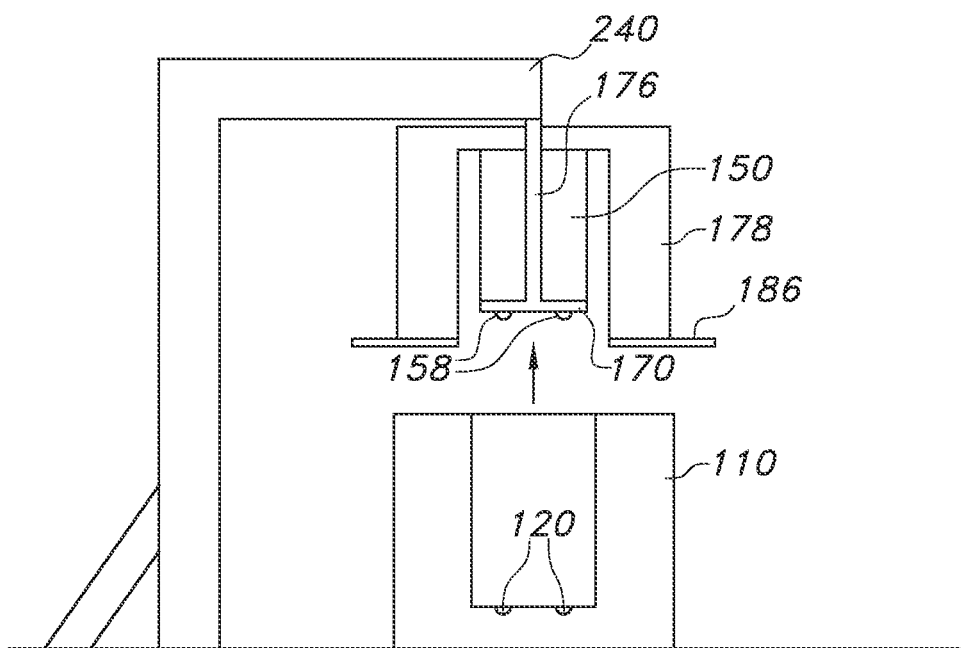
FIG. 9 is a schematic representation of one variation of the method for handling a nuclear reactor core.
Figure 10:
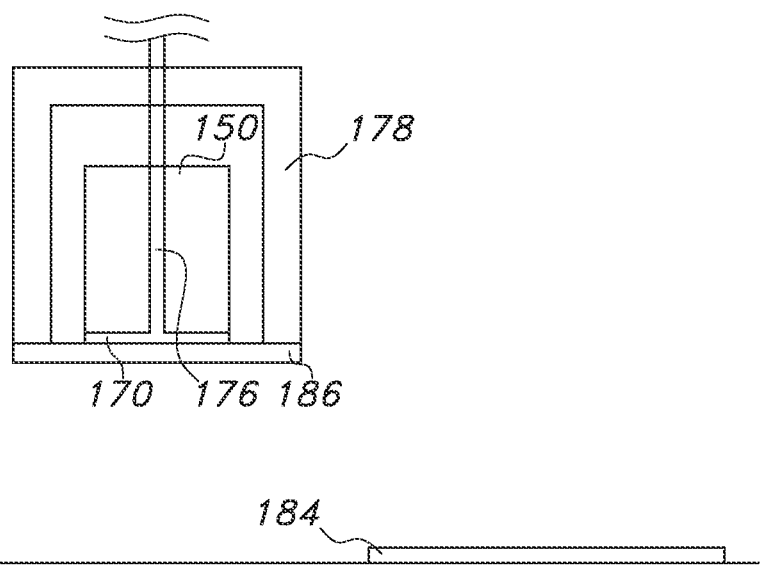
FIG. 10 is a flowchart representation of one variation the method for handling a nuclear reactor core.

As shown in FIG. 9, an automated method for removing a spent nuclear reactor core 150 can include: removing a vessel head 190 from a vessel 110 containing a spent nuclear reactor core 150; locating a shielded core transporter 178 to enshroud the spent nuclear reactor core 178 to a removing position over the vessel 110; and lowering a lift adapter 176 through the shielded core transporter 178 and the spent nuclear reactor core 150 to a lift-out support plate 170 arranged with the spent nuclear reactor core 150. The depicted method can further include: engaging the lift adapter 176 and the lift-out support plate 170; lifting the spent nuclear reactor core 150 from the vessel 110 into the shielded core transporter 178; and translating the spent nuclear reactor core 150 within the shielded core transporter 178 to a second location distal from the vessel 110.

The automated core replacement system 240 can execute the method of removing a spent nuclear reactor core 150 autonomously, semi-autonomously, or in response to operator input. In one variation of the example method, the automated core replacement system 240 can place the spent nuclear reactor core 150 on a distal plate 184, to which the shielded core transporter 178, encasing the spent nuclear reactor core 150, can be permanently affixed thereby readying the spent nuclear reactor core 150 for permanent storage.

In one variation of the methods described herein, the shielded core transporter 178 can include a distal shield 186 that is selectively and/or automatically closed, positioned, or arranged to shield an area below the nuclear reactor core 150 within the shielded core transporter 178. The distal shield 186 can be configured as: a sliding member or set of members that cooperatively cover the bottom end of the shielded core transporter 178; or as a mechanical or electromechanical shutter that encloses the bottom end of the shielded core transporter 178 when engaged.

The automated core replacement system 240 can include additional sensors, including biometric sensors, optical sensors, and radiation sensors, that can implement or execute the methods described herein. For example, in one variation of the methods described above, the automated core replacement system 240 can, prior to removal of the vessel head 190, verify that a human is in a safe location (e.g., outside of the hot cell) distal from the shielded core transporter 178 and the vessel 110 by registering a unique identifier of the human in the safe location distal from the shielded core transporter 178; and automatically prohibiting access to a hazardous location (e.g., the hot cell) proximate to the shielded core transporter 178. For example, the automated core replacement system 240 can employ biometric trackers, badging systems, or other access controls to: identify when all personnel are out of the hot cell prior to removing the vessel head 190; prohibit entry via locked doors or entryways into the hot cell while the nuclear reactor core 150 is partially exposed; and only permit entry via doors or entryways into the hot cell after the hot cell has been cleared for entry.

In another variation of the methods described herein, the automated core replacement system 240 can include surface and atmospheric radiological sensors to: conduct a surface radiological survey of a set of surfaces of the vessel to generate a surface radiological value; and conduct an atmospheric radiological survey of an atmosphere surrounding the vessel to generate an atmospheric radiological value. Additionally, the automated core replacement system 240 can integrate findings or values sampled by the radiological sensors to selectively permit or prohibit access into the hot cell. For example, if the detected radiological values for the surfaces and the atmosphere are below respective threshold values, then the automated core replacement system 240 can permit access to the hot cell, for example by permitting access through doors or entryways. Conversely, if the detected radiological values for the surfaces and the atmosphere are above respective threshold values, then the automated core replacement system 240 can automatically prohibit access to the hot cell, for example by prohibiting access through locking doors or locking entryways.

In another variation of the example methods, the automated core replacement system 240 can further include optical sensors to: optically inspect the (new or spent) nuclear reactor core 150 and the vessel 110 for debris such as graphite particulate, excess working fluids, chips, cracks, defects, or any other indicia that the nuclear reactor core 150 or the vessel 110 is not suited for a duty cycle. In executing this variation of the methods, the automated core replacement system 240 can employ optical recognition or machine vision techniques to: automatically classify or detect aberrations, material residue, and/or damaged components within the nuclear reactor core 150 and the vessel 110.

In yet another variation of the methods described herein, the automated core replacement system 240 can include a mechanized, robotic, or remotely controlled armature or subsystem that, subsequent to sealing the vessel head 190 onto the vessel 110, automatically welds a metal seal bonding the vessel head 190 to the vessel 110. For example, the automated core replacement system 240 can include a remotely controlled armature that, responsive to user input from a location outside of the hot cell, seats and welds a metal seal to the junction of the vessel head 190 and the vessel 110 to seal the nuclear reactor core 150 inside the vessel. Alternatively or additionally, the automated core replacement system 240 can execute the foregoing autonomously, for example a preprogrammed robot can function to seat and weld the metal seal to the junction of the vessel head 190 and the vessel 110. In yet another alternative to this variation of the example methods, the automated core replacement system 240 can either autonomously or semi-autonomously seat and drive a set of bolts that further affix and seal the vessel head 190 and the vessel 110 together into a unified structure.

The automated core replacement system 240 can be further configured to perform the example methods sequentially during a nuclear refueling process in which the spent nuclear reactor core 150 is removed from the vessel 110, placed on the distal plate 184, and readied for permanent storage. The automated core replacement system 240 can then: retrieve and position a new nuclear reactor core 150, align the nuclear reactor core 150 and the vessel 110, and place the nuclear reactor core 150 inside the vessel 110 as described above. In one variation of the nuclear refueling process, the set of control drums 130 can be set to a predetermined shutdown position in which the neutron poison is arranged closest to the central axis 118 while the lift adapter 176, including a neutron poison shell or coating, is inserted into the central void to engage the lift out support plate 170. Therefore, upon entry and egress from the vessel 110, the moderating core structure 152 will be surrounded by neutron poison from the inside and/or outside of its annular structure to keep the neutron transmission and fission reactions to a minimal level until the system 100 is readied for initialization.

11. Example Implementations

Once the system 100 is returned to a processing facility, the system 100 is loaded into a hot cell including an automated core replacement system 240 that: replaces a spent nuclear reactor core 150 with a new replacement nuclear reactor core 150 autonomously and/or via remote manual control, such as within hours of receipt of the system 100.

Additionally or alternatively, some or all of the foregoing steps of the refueling cycle can be controlled manually by a remote operator outside of the hot cell. Additionally or alternatively, this refueling cycle can be executed manually in-field or autonomously by a mobile automated core replacement system 240.

11.1 Example Automated Refueling Cycle

In the foregoing example, during the refueling cycle, the exterior walls and/or a top cover of a container or transporter of the system 100 are removed from the chassis, and the hot cell is opened. The system 100 with the sealed reactor vessel 110 containing the spent nuclear reactor core 150, and a new replacement core 150 in a core transporter 178 are loaded into the hot cell. A working fluid supply and return line within the hot cell is connected to a working fluid port along the flow path, such as near the pump.

The hot cell is then closed, sealed, and purged with a secondary purge gas (e.g., dry nitrogen) to drive humidity out of the hot cell. A (slight) vacuum is then drawn on the hot cell to create a negative-pressure environment within the hot cell. The working fluid port on the system 100 is then opened, and the automated core replacement system 240 pumps working fluid out of the reactor vessel 110 and the flow path, through a filter to remove radioactive particulate (e.g., carbon dust from the moderating core structure), and into a working fluid storage chamber. (The automated core replacement system 240 can also refill the reactor vessel with filtered working fluid from this storage chamber via the working fluid port and can re-evacuate and filter the working fluid from the reactor vessel in order to remove additional radioactive particulate from the flow path.) The automated core replacement system 240 can also fill the reactor vessel with the secondary purge gas in order to prevent condensation on surfaces within the reactor vessel 110 once the vessel head 190 is removed therefrom.

The automated core replacement system 240 can then: drive a gantry—within the hot cell—over the system 100; detect a set of optical fiducials on the outside of the vessel 110 via an overhead sensor system (e.g., a set of cameras) mounted to the gantry or directly measure the vessel 110 via a set of contact-based sensors to locate the vessel 110 within the hot cell; and map the location of the reactor vessel 110 within the hot cell accordingly. The automated core replacement system 240 can also repeat this process to similarly locate the spent nuclear reactor core 150, the new replacement nuclear reactor core 150, and/or a magazine of replacement control drums, etc. currently housed within the hot cell.

The automated core replacement system 240 then: locates a robotic weld-grinding system on a welded flange between the reactor vessel 110 and the vessel head 190; and actuates the robotic weld-grinding system to drive the robotic weld-grinding system across a weld bead along the full perimeter of the welded flange, thereby severing the vessel head 190 from the vessel 110. During this period, the automated core replacement system 240 can also draw vacuum or hold a lower pressure in the reactor vessel 110 in order to retain the vessel head 190 against the vessel 110 even as this weld is cut. (Alternatively, fasteners between the vessel and vessel head can be removed and the welded flange can be cut manually by a human operator before the hot cell is vacated.)

The automated core replacement system 240 can then: drive the gantry toward to the vessel head 190 and engage a lifting point on the vessel head 190 with a hook or electromagnet mounted to the gantry; and release secondary purge gas into the reactor vessel 110—via the working fluid port on the system 100—up to or past the pressure inside of the hot cell in order to release the vessel head 190 from the vessel 110. The hot cell can then: retract the gantry to lift the vessel head 190 from the reactor vessel 110; return the vessel head 190 to a holding area overhead the system 100 and/or toward a rear of the hot cell; and release the vessel head 190 in this holding area.

The automated core replacement system 240 can implement similar methods and techniques to open the spent-fuel container—such as by hinging open or removing the spent-fuel container lid—to expose a spent-core receptacle and a set of spent-control receptacles within the spent-fuel container.

In the event a core drum from the set of core drums 130 needs to be replaced, the automated core replacement system 240 can then: drive the gantry back to the vessel head; engage a lifting point on a first control drum with the hook or electromagnet mounted to the gantry; lift the first control drum out of the vessel; advance the first control drum toward a first spent-control receptacle in the spent-fuel container; track a position of first control drum relative to optical fiducials near the first spent-control receptacle in the spent-fuel container while lowering the first control drum into the first spent-control receptacle; and then release the first control drum in the first spent-control receptacle. If necessary, the automated core replacement system 240 can repeat this process for each other control drum in the set of control drums 130 in the reactor vessel 110.

Subsequently, the automated core replacement system 240 can implement similar methods and techniques to: remove the transient graphite plug (if any) from the moderating core structure 152; engage a lifting point on the spent nuclear reactor core 150—structurally connected to the lift-out support plate 170—with the lift adapter 176 mounted to the gantry; lift the spent nuclear reactor core 150 out of the vessel receptacle 116, as shown in FIG. 9; advance the gantry and the spent nuclear reactor core 150 toward a blind flange 184; track the position of the spent nuclear reactor core 150 relative to optical fiducials near the blind flange 184 while lowering the spent nuclear reactor core 150 onto the blind flange 184; and then release the core assembly on the blind flange 184 for subsequent sealing and permanent storage. As noted above, the lift adapter 176 can include boron carbide shielding into the central void of the moderating core structure 152 to engage the lift-out support plate 170 and then lift the moderating core structure 152 out of the reactor vessel 110 along the central axis 118.

The automated core replacement system 240 can then lower a borescope into the reactor vessel 110 and execute an autonomous or manually controlled inspection cycle to verify absence of debris and damage inside the core receptacle 116.

If necessary, the automated core replacement system 240 implements similar methods and techniques to transfer new control drums from the control drum magazine onto corresponding control drum actuators in the interstitial zone of the reactor vessel 110; to transfer the new nuclear reactor core 150 into the reactor vessel 110; and to return the vessel head 190 or a new vessel head 190 onto the reactor vessel 110.

Once the automated core replacement system 240 returns the vessel head 190 to the reactor vessel 110, the automated core replacement system 240 can draw the secondary purge gas back out of the vessel 110 via the working fluid port in order to draw the vessel head 190 downward onto the reactor vessel 110 and to retain the vessel head 190 against the flange of the reactor vessel 110. Additionally, the automated core replacement system 240 can locate the robotic welding system on the vessel 110 to re-weld the joint between the vessel head 190 and the reactor vessel 110, thereby enclosing and sealing the new nuclear reactor core 150 within the reactor vessel 110.

The automated core replacement system 240 can then purge and refill the flow path with the working fluid (e.g., helium) up to a baseline gas pressure inside the system 100. The automated core replacement system 240 can also remove and/or filter the (primary) working fluid and the secondary purge gas remaining within the hot cell before opening and releasing the refueled system.

11.2 Deep Container Cover and Spent-Fuel Container

Alternatively, in one variation of the methods described herein, the spent-fuel container can include: a shallow container base including a blind flange 184; a shielded core transporter 178; and a lift adapter 176 (containing B4C) extending downwardly from the shielded core transporter 178. Accordingly, the automated core replacement system 240 can: drive the gantry over the spent-fuel container; engage and lift the shielded core transporter 178; return to the reactor vessel 110 to locate the shielded core transporter 178 over the reactor vessel 110 with the lift adapter 176 centered over a corresponding central void in the moderating core structure 152; extend the lift adapter 176 downward to engage the integrated connector 174 on the lift-out support plate 170; and then raise the integrated connector 174 to raise the spent nuclear reactor core 150 into the shielded core transporter 178, thereby both shielding the nuclear reactor core 150 and reducing reactivity of the nuclear reactor core 150. The automated core replacement system 240 can then return the shielded core transporter 178 and the spent nuclear core reactor 150 to the blind flange 184, which is then fastened and/or welded to the shielded core transporter 178 autonomously by the automated core replacement system 240 and/or manually by operating personnel.

In this variation, a new nuclear reactor core 150 can be housed in a similar container within a deep shielded core transporter 178, and the automated core replacement system 240 can: locate the shielded core transporter 178—housing the new nuclear reactor core 150—over the reactor vessel 110; lower the new nuclear reactor core 150 from the shielded core transporter 178 into the reactor vessel 110; and then return the shielded core transporter 178 to its corresponding container base before reinstalling the vessel head 190 on the reactor vessel 110.

11.3 Control Drum and Nuclear Reactor Core Co-storage

In another example implementation of the methods described herein, both the spent nuclear reactor core 150 and control drums 130 are replaced during a refueling cycle in the hot cell. Accordingly, a nuclear reactor core 150 can be paired with a spent-fuel container (or a shielded core transporter 178) that includes: a spent-core receptacle surrounded by a set of spent-control drum receptacles; a second set of locating datums—similar to set of locating datums in the reactor vessel 110—configured to locate the spent nuclear reactor core 150; and a spent-fuel container lid that includes a second set of restraining pins like the set of upper restraining pins 222 on the underside of the vessel head 190 and configured to seal the nuclear reactor core 150 and control drums 130 inside of the spent-fuel container.

Therefore, during a refueling cycle, the spent nuclear reactor core 150 is removed from the reactor vessel 110 and placed in the spent-fuel container. Spent control drums 130 are also removed from the reactor vessel 110 and placed in the same spent-fuel container. Because the spent control drums 130 still contain neutron poison and absorb neutrons radiated by the spent nuclear reactor core 150 after removal, the control drums 130 can be oriented in the spent-fuel container such that the sections of these control drums including neutron poison face inwardly toward the spent nuclear reactor core 150, thereby containing radiation, throttling nuclear reactivity, and maintaining lower temperatures within the spent-fuel container once enclosed and sealed with the spent-fuel container lid.

12. Hanging Control Drums

In another variation of the methods described herein, the system 100 includes a set of control drum actuators 140 mounted to and extending above the top of the vessel head 190 and arranged in a radial pattern, as described above. Each control drum actuator can include a position sensor to determine an angular position of the main shaft 132, which extends from the control drum actuator 140 downwardly toward the inner surface of the vessel head 190. Each main shaft 132 can be coupled to and suspend a control drum 130 within the interstitial zone when the vessel head 190 is installed on the reactor vessel 110.

Thus, in this variation, when the vessel head 190 is removed from the reactor vessel 110 during the refueling cycle described above, the set of control drums 130 are withdrawn from the reactor vessel 110 as an assembly with the vessel head 190. The automated core replacement system 240 can then: transport this vessel head 190 and control drum 130 assembly to the spent-fuel container; angularly align the vessel head 190 and control drum 130 assembly with the spent-fuel container; and lower the vessel head 190 and control drum 130 assembly toward the spent-fuel container.

In this implementation, the main shafts 132 connecting the control drums 130 to the control drum actuators 140 can include quick-release mechanisms, and corresponding features in the spent-fuel container can engage these quick-release mechanisms to release the control drums 130 from these main shafts 132 as or once the control drums 130 mate with corresponding spent-control receptacles within the spent-fuel container. With these quick-release mechanisms thus engaged, the automated core replacement system 240 can: retract the vessel head 190 vertically from the spent fuel container, thereby releasing the vessel head 190 from the control drums 130; return the vessel head 190 to the holding area described above; and later reinstall the vessel head 190 on the reactor vessel 110 once a new nuclear reactor core 150 is loaded into the reactor vessel 110.

In another implementation in which the control drums 130 are configured for extended deployment with multiple replacement nuclear reactor cores 150 over time, the automated core replacement system 240 can: return the vessel head 190 and control drum 130 assembly to the holding area immediately after removal from the vessel 110; and later return the vessel head 190 and control drum 130 assembly to the vessel 110 once the replacement nuclear reactor core 150 is installed in the vessel 110, as described above.

In yet another implementation in which the control drums 130 are configured for a single deployment with a single nuclear reactor core 150, the automated core replacement system 240 can: return the vessel head 190 and control drum 130 assembly to the holding area immediately after removal from the vessel 110; transfer the spent nuclear reactor core 150 from the vessel 110 into the spent-fuel container; load the spent nuclear reactor core 150 into the spent-fuel container; transfer the vessel head 190 and control drum 130 assembly to the spent-fuel container; insert the spent control drums 130 into the spent-fuel container and surrounding the spent nuclear reactor core 150; seat the vessel head 190 onto a flange extending about a perimeter of the spent-fuel container; and then implement methods and techniques described above to weld the vessel head 190 to the spent-fuel container about the full perimeter of the flange, thereby sealing the spent control drums 130 and spent nuclear reactor core 150 inside of the spent-fuel container.

In this implementation, the hot cell can also be preloaded with a replacement vessel head 190 and control drum 130 assembly in preparation for a refueling cycle. Therefore, once a replacement nuclear reactor core 150 is installed in the vessel 110, the automated core replacement system 240 can: transfer the replacement vessel head 190 and control drum 130 assembly to the vessel 110; insert the replacement control drums 130 into the vessel 110 about the replacement nuclear reactor core 150; seat the replacement vessel head 190 on the flange extending about the perimeter of the vessel 110; and then implement methods and techniques described above to weld the replacement vessel head 190 to the vessel 110 about the full perimeter of the flange, thereby sealing the replacement control drums 130 and the replacement nuclear reactor core 150 inside of the vessel.

As a person skilled in the art will recognize from the previous detailed description and from the figures and claims, modifications and changes can be made to the embodiments of the invention without departing from the scope of this invention as defined in the following claims.

We claim:

1. A method for replacing a spent nuclear reactor core comprising:
   removing a vessel head from a vessel containing a spent nuclear reactor core, wherein the spent nuclear reactor core comprises plural spent fuel assemblies;
   locating to a removing position over the vessel, a first shielded core transporter configured to enshroud the spent nuclear reactor core;
   lowering a lift adapter to a lift-out core support arranged with the spent nuclear reactor core;
   engaging the lift adapter and the lift-out core support;
   lifting the lift adapter to lift the spent nuclear reactor core from the vessel into the first shielded core transporter;
   translating the spent nuclear reactor core within the first shielded core transporter to a second location distal from the vessel;
   locating to a lowering position over the vessel, a second shielded core transporter enshrouding a new nuclear reactor core, wherein the new nuclear reactor core comprises one or more new fuel assemblies, and wherein a new lift-out core support is arranged with the new nuclear reactor core;
   connecting the lift adapter and the new lift-out core support;
   aligning a set of locating features arranged on the new lift-out core support to a set of datum arranged in a base of the vessel;
   lowering the lift adapter to lower the new nuclear reactor core from the second shielded core transporter into the vessel such that the set of locating features engage with the set of datum;
   disengaging the lift adapter from the new lift-out core support;
   moving the lift adapter into the second shielded core transporter;
   removing the second shielded core transporter from the lowering position;
   arranging the vessel head onto the vessel; and
   sealing the vessel head onto the vessel.

2. The method of claim 1, further comprising, prior to locating the first shielded core transporter to the lowering position over the vessel:
   verifying that a human is in a safe location distal from the first shielded core transporter and the vessel by registering a unique identifier of the human in the safe location distal from the first shielded core transporter; and
   prohibiting access to a hazardous location proximate to the first shielded core transporter.

3. The method of claim 2, further comprising:
   conducting a surface radiological survey of a set of surfaces of the vessel to generate a surface radiological value; and
   conducting an atmospheric radiological survey of an atmosphere surrounding the vessel to generate an atmospheric radiological value.

4. The method of claim 3, further comprising:
   in response to a threshold surface radiological value exceeding the generated surface radiological value and a threshold atmospheric radiological value exceeding the generated atmospheric radiological value,
   permitting access to the hazardous location proximate the vessel.

5. The method of claim 4, further comprising
   prior to arranging the vessel head onto the vessel, optically inspecting the new nuclear reactor core and the vessel for debris.

6. The method of claim 5, further comprising:
   prior to translating the spent nuclear reactor core within the first shielded core transporter to a second location distal from the vessel, shielding a distal end of the first shielded core transporter adjacent the lift out core support; and
   wherein the second location comprises a blind flange on which the first shielded core transporter is lowered for subsequent storage.

7. The method of claim 6, wherein shielding a distal end of the first shielded core transporter adjacent the lift out core support comprises:
   detecting removal of the first shielded core transporter from the vessel; and
   closing a distal shield coupled to the first shielded core transporter in response to removal of the first shielded core transporter from the vessel.

8. Method of claim 7, wherein the lift adapter comprises boron carbide to:
   minimize reactivity of the spent nuclear reactor core while the lift adapter is engaged with the lift-out core support; and
   minimize reactivity of the spent nuclear reactor core while the spent nuclear reactor core is disposed in the first shielded core transporter.

9. The method of claim 8, wherein engaging the lift adapter and the lift-out support plate comprises securing the lift adapter to an integrated connector coupled with the lift-out core support such that the lift adapter can move the lift-out core support in a direction substantially parallel to an axis of the lift adapter.

10. The method of claim 9, wherein the lift adapter comprises:
   a coupling configured to selectively engage with the integrated connector;
   an engagement sensor configured to determine whether the lift adapter is connected to the integrated connector; and
   a controller connected to the engagement sensor and configured to:
      affirm connection between the lift adapter and the integrated connector prior to moving the lift-out core support; and
      affirm disconnection between the lift adapter and the integrated connector subsequent to moving the lift-out core support.

* * * * *